US012633564B2

(12) United States Patent
Dugas

(10) Patent No.: US 12,633,564 B2
(45) Date of Patent: May 19, 2026

(54) BATTERY LIFT AND TRANSFER SOLUTIONS FOR ASSEMBLING TRACTION BATTERY PACKS

(71) Applicant: FORD GLOBAL TECHNOLOGIES, LLC, Dearborn, MI (US)

(72) Inventor: Marc Dugas, Wixom, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 765 days.

(21) Appl. No.: 17/947,278

(22) Filed: Sep. 19, 2022

(65) Prior Publication Data

US 2023/0307687 A1 Sep. 28, 2023

Related U.S. Application Data

(60) Provisional application No. 63/322,766, filed on Mar. 23, 2022.

(51) Int. Cl.
| | |
|---|---|
| *H01M 10/04* | (2006.01) |
| *B23K 26/21* | (2014.01) |
| *B23K 37/04* | (2006.01) |
| *B23K 101/36* | (2006.01) |
| *B60L 50/64* | (2019.01) |
| *H01M 50/204* | (2021.01) |

(52) U.S. Cl.
CPC ......... *H01M 10/0404* (2013.01); *B23K 26/21* (2015.10); *B23K 37/0426* (2013.01); *B60L 50/64* (2019.02); *H01M 50/204* (2021.01); *B23K 2101/36* (2018.08)

(58) Field of Classification Search
CPC ...... B23K 101/36; B23K 26/21; B23K 37/04; B60L 50/64; H01M 10/04; H01M 50/204
See application file for complete search history.

(56) References Cited

U.S. PATENT DOCUMENTS

| | | | |
|---|---|---|---|
| 8,089,248 B2 | 1/2012 | Tabatowski-Bush | |
| 8,968,912 B2 | 3/2015 | Maguire et al. | |
| 9,217,781 B2 | 12/2015 | Tabatowski-Bush et al. | |
| 9,421,656 B2 | 8/2016 | Kitagawa et al. | |
| 9,425,628 B2 | 8/2016 | Pham et al. | |
| 9,446,680 B2 | 9/2016 | Chen et al. | |
| 9,515,357 B2 | 12/2016 | Haskins et al. | |
| 9,604,755 B2 | 3/2017 | Ouchi et al. | |
| 9,722,222 B2 * | 8/2017 | Kim ................... | H01M 50/507 |

(Continued)

FOREIGN PATENT DOCUMENTS

| | | |
|---|---|---|
| CN | 101860053 A | 10/2010 |
| CN | 101860053 B | 4/2015 |

(Continued)

*Primary Examiner* — Minh N Trinh
(74) *Attorney, Agent, or Firm* — David B. Kelley; Carlson, Gaskey & Olds, P.C.

(57) ABSTRACT

Manufacturing processes are disclosed for assembling traction battery packs that battery systems. Exemplary traction battery pack assembly methods may include lifting and transferring battery cells between assembly line workstations, such as a cell matrix assembly workstation and a welding workstation. The method may further involve the use of automated tooling, such as a cell-to-matrix pusher and a cell matrix support structure that includes locator pads for supporting a non-rigid grouping of battery cell during workstation transfers.

20 Claims, 4 Drawing Sheets

(56) References Cited

U.S. PATENT DOCUMENTS

| | | |
|---|---|---|
| 9,799,932 B2 | 10/2017 | Haskins et al. |
| 10,109,897 B2 | 10/2018 | Haskins et al. |
| 10,566,647 B2 | 2/2020 | Andryukov et al. |
| 10,601,006 B2 | 3/2020 | Maguire et al. |
| 10,608,222 B2 | 3/2020 | Montgomery et al. |
| 10,759,281 B2 | 9/2020 | Miller et al. |
| 10,784,495 B2 | 9/2020 | Fernandez-Galindo et al. |
| 11,005,131 B2 | 5/2021 | Zhou et al. |
| 11,024,913 B2 | 6/2021 | Subramanian et al. |
| 11,050,125 B1 | 6/2021 | Zhu et al. |
| 11,114,726 B2 | 9/2021 | Gu et al. |
| 11,128,009 B2 | 9/2021 | Chen et al. |
| 11,139,537 B2 | 10/2021 | Wu et al. |
| 11,217,847 B2 | 1/2022 | Eftekhari et al. |
| 11,258,119 B2 | 2/2022 | Wang et al. |
| 11,264,669 B2 | 3/2022 | Jiang |
| 11,283,130 B2 | 3/2022 | Chen et al. |
| 11,289,750 B2 | 3/2022 | Zhou et al. |
| 11,302,972 B2 | 4/2022 | Chu et al. |
| 11,302,973 B2 | 4/2022 | Maguire et al. |
| 11,302,990 B2 | 4/2022 | Huang et al. |
| 11,329,347 B2 | 5/2022 | Huang et al. |
| 11,335,960 B2 | 5/2022 | Wang et al. |
| 11,362,392 B2 | 6/2022 | Wang et al. |
| 11,362,393 B2 | 6/2022 | Wang et al. |
| 11,387,519 B2 | 7/2022 | Huang et al. |
| 11,404,744 B1 | 8/2022 | Yang et al. |
| 11,417,932 B2 | 8/2022 | Tang et al. |
| 11,417,936 B2 | 8/2022 | Wang et al. |
| 12,230,826 B2 * | 2/2025 | Maguire ............. H01M 50/264 |
| 2002/0007552 A1 * | 1/2002 | Singleton .......... H01M 10/0436 |
| | | 29/730 |
| 2010/0259221 A1 | 10/2010 | Tabatowski-Bush |
| 2013/0164592 A1 | 6/2013 | Maguire et al. |
| 2013/0177793 A1 | 7/2013 | Seki |
| 2017/0104251 A1 | 4/2017 | Wang |
| 2019/0305389 A1 | 10/2019 | Poirier et al. |
| 2020/0091494 A1 | 3/2020 | Fernandez-Galindo et al. |
| 2020/0203684 A1 | 6/2020 | Chen et al. |
| 2020/0203779 A1 | 6/2020 | Wang et al. |
| 2020/0212387 A1 | 7/2020 | Su et al. |
| 2020/0212397 A1 | 7/2020 | Wang et al. |
| 2020/0212418 A1 | 7/2020 | Chen et al. |
| 2020/0381697 A1 | 12/2020 | Fernandez-Galindo et al. |
| 2021/0066686 A1 | 3/2021 | Siewert et al. |
| 2021/0091348 A1 | 3/2021 | Lateef et al. |
| 2021/0091437 A1 | 3/2021 | Chen et al. |
| 2021/0104798 A1 | 4/2021 | Jiang et al. |
| 2021/0119279 A1 | 4/2021 | Wang et al. |
| 2021/0218117 A1 | 7/2021 | Zhu et al. |
| 2021/0229541 A1 | 7/2021 | Smith et al. |
| 2021/0305641 A1 | 9/2021 | Bai et al. |
| 2021/0305642 A1 | 9/2021 | Bai et al. |
| 2021/0320349 A1 | 10/2021 | Jiang et al. |
| 2021/0320372 A1 | 10/2021 | Jiang et al. |
| 2021/0402863 A1 | 12/2021 | Huang et al. |
| 2021/0408634 A1 | 12/2021 | Yin et al. |
| 2022/0052414 A1 | 2/2022 | Huang et al. |
| 2022/0052415 A1 | 2/2022 | Huang et al. |
| 2022/0059897 A1 | 2/2022 | Huang et al. |
| 2022/0059902 A1 | 2/2022 | Jiang et al. |
| 2022/0077521 A1 | 3/2022 | Jin et al. |
| 2022/0085450 A1 | 3/2022 | Chu et al. |
| 2022/0102800 A1 | 3/2022 | Wang et al. |
| 2022/0109211 A1 | 4/2022 | Wang et al. |
| 2022/0123394 A1 | 4/2022 | Zhang et al. |
| 2022/0123423 A1 | 4/2022 | Wang et al. |
| 2022/0149458 A1 | 5/2022 | Jiang et al. |
| 2022/0158296 A1 | 5/2022 | Chen et al. |
| 2022/0185088 A1 | 6/2022 | Zhang et al. |
| 2022/0190416 A1 | 6/2022 | Wu |
| 2022/0190423 A1 | 6/2022 | Wu et al. |
| 2022/0216555 A1 | 7/2022 | Huang et al. |
| 2022/0221084 A1 | 7/2022 | Huang et al. |
| 2022/0231370 A1 | 7/2022 | Yang et al. |
| 2022/0231371 A1 | 7/2022 | Jiang et al. |
| 2022/0255172 A1 | 8/2022 | Guo et al. |
| 2023/0307687 A1 * | 9/2023 | Dugas ................... B23K 26/21 |

FOREIGN PATENT DOCUMENTS

| | | |
|---|---|---|
| CN | 107757374 A | 3/2018 |
| CN | 208738329 U | 4/2019 |
| CN | 209016158 U | 6/2019 |
| CN | 209045657 U | 6/2019 |
| CN | 110048042 A | 7/2019 |
| CN | 209071465 U | 7/2019 |
| CN | 209104196 U | 7/2019 |
| CN | 209104221 U | 7/2019 |
| CN | 209104222 U | 7/2019 |
| CN | 209104228 U | 7/2019 |
| CN | 209104229 U | 7/2019 |
| CN | 209104230 U | 7/2019 |
| CN | 209104232 U | 7/2019 |
| CN | 209104234 U | 7/2019 |
| CN | 209104235 U | 7/2019 |
| CN | 209104236 U | 7/2019 |
| CN | 209104237 U | 7/2019 |
| CN | 209104238 U | 7/2019 |
| CN | 209104242 U | 7/2019 |
| CN | 209104331 U | 7/2019 |
| CN | 209183581 U | 7/2019 |
| CN | 209183604 U | 7/2019 |
| CN | 209183605 U | 7/2019 |
| CN | 209183611 U | 7/2019 |
| CN | 209183612 U | 7/2019 |
| CN | 209183614 U | 7/2019 |
| CN | 209249637 U | 8/2019 |
| CN | 209357799 U | 9/2019 |
| CN | 209401679 U | 9/2019 |
| CN | 209401680 U | 9/2019 |
| CN | 209401682 U | 9/2019 |
| CN | 209401684 U | 9/2019 |
| CN | 209401715 U | 9/2019 |
| CN | 209447908 U | 9/2019 |
| CN | 110350256 A | 10/2019 |
| CN | 110416448 A | 11/2019 |
| CN | 209592271 U | 11/2019 |
| CN | 209607884 U | 11/2019 |
| CN | 209641720 U | 11/2019 |
| CN | 209710493 U | 11/2019 |
| CN | 209730104 U | 12/2019 |
| CN | 209747621 U | 12/2019 |
| CN | 209787546 U | 12/2019 |
| CN | 209843820 U | 12/2019 |
| CN | 209936788 U | 1/2020 |
| CN | 110931700 A | 3/2020 |
| CN | 210136922 U | 3/2020 |
| CN | 210136943 U | 3/2020 |
| CN | 210182435 U | 3/2020 |
| CN | 210566905 U | 5/2020 |
| CN | 111354885 A | 6/2020 |
| CN | 210744037 U | 6/2020 |
| CN | 111384314 B | 1/2021 |
| CN | 111384325 B | 2/2021 |
| CN | 112310525 A | 2/2021 |
| CN | 112331982 A | 2/2021 |
| CN | 109742281 B | 5/2021 |
| CN | 111354987 B | 5/2021 |
| CN | 111384337 B | 5/2021 |
| CN | 112331981 B | 9/2021 |
| CN | 112331997 B | 11/2021 |
| CN | 113871789 A | 12/2021 |
| CN | 112310541 B | 3/2022 |
| CN | 216054919 U | 3/2022 |
| CN | 216120549 U | 3/2022 |
| CN | 216120659 U | 3/2022 |
| CN | 216213898 U | 4/2022 |
| CN | 216354437 U | 4/2022 |
| CN | 216354439 U | 4/2022 |
| CN | 111430826 B | 6/2022 |
| CN | 216720168 U | 6/2022 |
| CN | 216720172 U | 6/2022 |
| CN | 216750072 U | 6/2022 |

(56)  References Cited

FOREIGN PATENT DOCUMENTS

| | | | |
|---|---|---|---|
| CN | 216750142 U | | 6/2022 |
| CN | 216872085 U | | 7/2022 |
| CN | 216903107 U | | 7/2022 |
| CN | 216903128 U | | 7/2022 |
| CN | 216903497 U | | 7/2022 |
| DE | 102016119118 A1 | | 4/2017 |
| DE | 102017121796 A1 | | 3/2018 |
| DE | 102019108631 A1 | | 10/2019 |
| DE | 102019125140 A1 | | 3/2020 |
| DE | 102020124986 A1 | | 3/2021 |
| DE | 102021101385 A1 | | 9/2021 |
| EP | 3671904 A1 | | 6/2020 |
| EP | 3671940 A1 | | 6/2020 |
| EP | 3672377 A1 | | 6/2020 |
| EP | 3675204 A1 | | 7/2020 |
| EP | 3675207 A1 | | 7/2020 |
| EP | 3675216 B1 | | 7/2020 |
| EP | 3675217 A1 | | 7/2020 |
| EP | 3675220 A1 | | 7/2020 |
| EP | 3675221 A1 | | 7/2020 |
| EP | 3675236 A1 | | 7/2020 |
| EP | 3675271 A1 | | 7/2020 |
| EP | 3798491 A1 | | 3/2021 |
| EP | 3799150 A1 | | 3/2021 |
| EP | 3799151 A1 | | 3/2021 |
| EP | 3905366 A1 | | 3/2021 |
| EP | 3806231 A1 | | 4/2021 |
| EP | 3852187 A1 | | 7/2021 |
| EP | 3920255 A1 | | 8/2021 |
| EP | 3883005 A1 | | 9/2021 |
| EP | 3883006 A1 | | 9/2021 |
| EP | 3883042 A1 | | 9/2021 |
| EP | 3886198 A1 | | 9/2021 |
| EP | 3886200 A1 | | 9/2021 |
| EP | 3886201 A1 | | 9/2021 |
| EP | 3671893 B1 | | 11/2021 |
| EP | 3699979 B1 | | 11/2021 |
| EP | 3920315 A1 | | 12/2021 |
| EP | 3930027 A1 | | 12/2021 |
| EP | 3944397 A1 | | 1/2022 |
| EP | 3944398 A1 | | 1/2022 |
| EP | 3955333 A1 | | 2/2022 |
| EP | 3799194 B1 | | 3/2022 |
| EP | 3985787 A1 | | 4/2022 |
| EP | 3799153 B1 | | 6/2022 |
| JP | 2010246372 A | | 10/2010 |
| KR | 20040045577 A | * | 6/2004 |
| KR | 1020100112530 A | | 10/2010 |
| KR | 101695641 B1 | | 1/2017 |
| KR | 101890701 B1 | | 8/2018 |

* cited by examiner

BATTERY LIFT AND TRANSFER SOLUTIONS FOR ASSEMBLING TRACTION BATTERY PACKS

CROSS-REFERENCE TO RELATED APPLICATIONS

This disclosure claims priority to U.S. Provisional Application No. 63/322,766, which was filed on Mar. 23, 2022 and is incorporated herein by reference.

TECHNICAL FIELD

This disclosure relates generally to traction battery packs that include battery systems, and more particularly to methods for lifting and transferring battery cells between manufacturing workstations during traction battery pack assembly processes.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack can power the electric machines and other electrical loads of the vehicle.

Conventional traction battery packs include groupings of battery cells called battery arrays. The battery arrays include various array support structures (e.g., array frames, spacers, rails, walls, end plates, bindings, etc.) that are arranged for grouping and supporting the battery cells in multiple individual units inside the traction battery pack enclosure.

SUMMARY

A method of assembling a traction battery pack according to an exemplary aspect of the present disclosure includes, among other things, inserting a cell matrix into a cell-receiving opening of a halo structure of a halo pallet at a first workstation of an assembly line, lifting the halo pallet with a cell matrix support structure that is at least partially positioned beneath the halo pallet, transferring the halo pallet from the first workstation to a second workstation of the assembly line with the cell matrix support structure, and positioning the halo pallet on top of a weld pallet located at the second workstation.

In a further non-limiting embodiment of the foregoing method, the cell matrix is part of a cell-to-pack battery system of the traction battery pack.

In a further non-limiting embodiment of either of the foregoing methods, the first workstation is a cell matrix assembly workstation, and the second workstation is a welding workstation.

In a further non-limiting embodiment of any of the foregoing methods, inserting the cell matrix includes pushing the cell matrix upwardly into the cell-receiving opening of the halo structure with a plunger of a cell-to-matrix pusher assembly.

In a further non-limiting embodiment of any of the foregoing methods, the method includes backing the plunger away from the halo pallet prior to lifting the halo pallet.

In a further non-limiting embodiment of any of the foregoing methods, the method includes positioning a locator pad of the cell matrix support structure within a gap located between an adjacent pair of plungers of a cell-to-matrix plunger assembly prior to lifting the halo pallet.

In a further non-limiting embodiment of any of the foregoing methods, the method includes backing the plungers away from the halo pallet after positioning the locator pad within the gap.

In a further non-limiting embodiment of any of the foregoing methods, positioning the halo pallet on top of the weld pallet includes positioning a locator pad of the cell matrix support structure within a gap located between an adjacent pair of pusher blocks of the weld pallet.

In a further non-limiting embodiment of any of the foregoing methods, the method includes welding a busbar module to the cell matrix at the second workstation.

In a further non-limiting embodiment of any of the foregoing methods, the welding includes laser welding.

A method for assembling a traction battery pack according to another exemplary aspect of the present disclosure includes, among other things, lifting a cell matrix with a cell matrix support structure, and transferring the cell matrix from a first workstation of an assembly line to a second workstation of the assembly line with the cell matrix support structure. During the lifting and the transferring, the cell matrix is supported in a Z-axis direction by a locator pad of the cell matrix support structure.

In a further non-limiting embodiment of the foregoing method, the cell matrix is part of a cell-to-pack battery system of the traction battery pack.

In a further non-limiting embodiment of either of the foregoing methods, the method includes positioning the locator pad of the cell matrix support structure within a gap located between an adjacent pair of plungers of a cell-to-matrix plunger assembly prior to lifting the cell matrix.

In a further non-limiting embodiment of any of the foregoing methods, the method includes inserting the cell matrix into a cell-receiving opening of a halo structure of a halo pallet prior to positioning the locator pad.

In a further non-limiting embodiment of any of the foregoing methods, inserting the cell matrix includes pushing the cell matrix upwardly into the cell-receiving opening with the plungers.

In a further non-limiting embodiment of any of the foregoing methods, transferring the cell matrix includes positioning the locator pad of the cell matrix support structure within a gap located between an adjacent pair of pusher blocks of a weld pallet located at the second workstation.

In a further non-limiting embodiment of any of the foregoing methods, the cell matrix support structure includes the locator pad and a second locator pad. The locator pad supports a first cell stack of the cell matrix during the lifting and the transferring, and the second locator pad supports a second cell stack of the cell matrix during the lifting and the transferring.

In a further non-limiting embodiment of any of the foregoing methods, the method includes welding a busbar module to the cell matrix at the second workstation.

In a further non-limiting embodiment of any of the foregoing methods, the welding includes laser welding.

In a further non-limiting embodiment of any of the foregoing methods, the first workstation is a cell matrix assembly workstation, and the second workstation is a welding workstation.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details manufacturing processes for assembling traction battery packs that include battery systems, such as cell-to-pack battery systems. An exemplary traction battery pack assembly method may include lifting and transferring a plurality of battery cells held within a four or five sided structure between assembly line workstations, such as a cell matrix assembly workstation and a welding workstation, or between assembly pallets. The method may further involve the use of automated tooling, such as a cell-to-matrix pusher and a cell matrix support structure that includes locator pads for supporting a non-rigid grouping of battery cell during workstation transfers. These and other features are discussed in greater detail in the following paragraphs of this detailed description.

Figure 1:
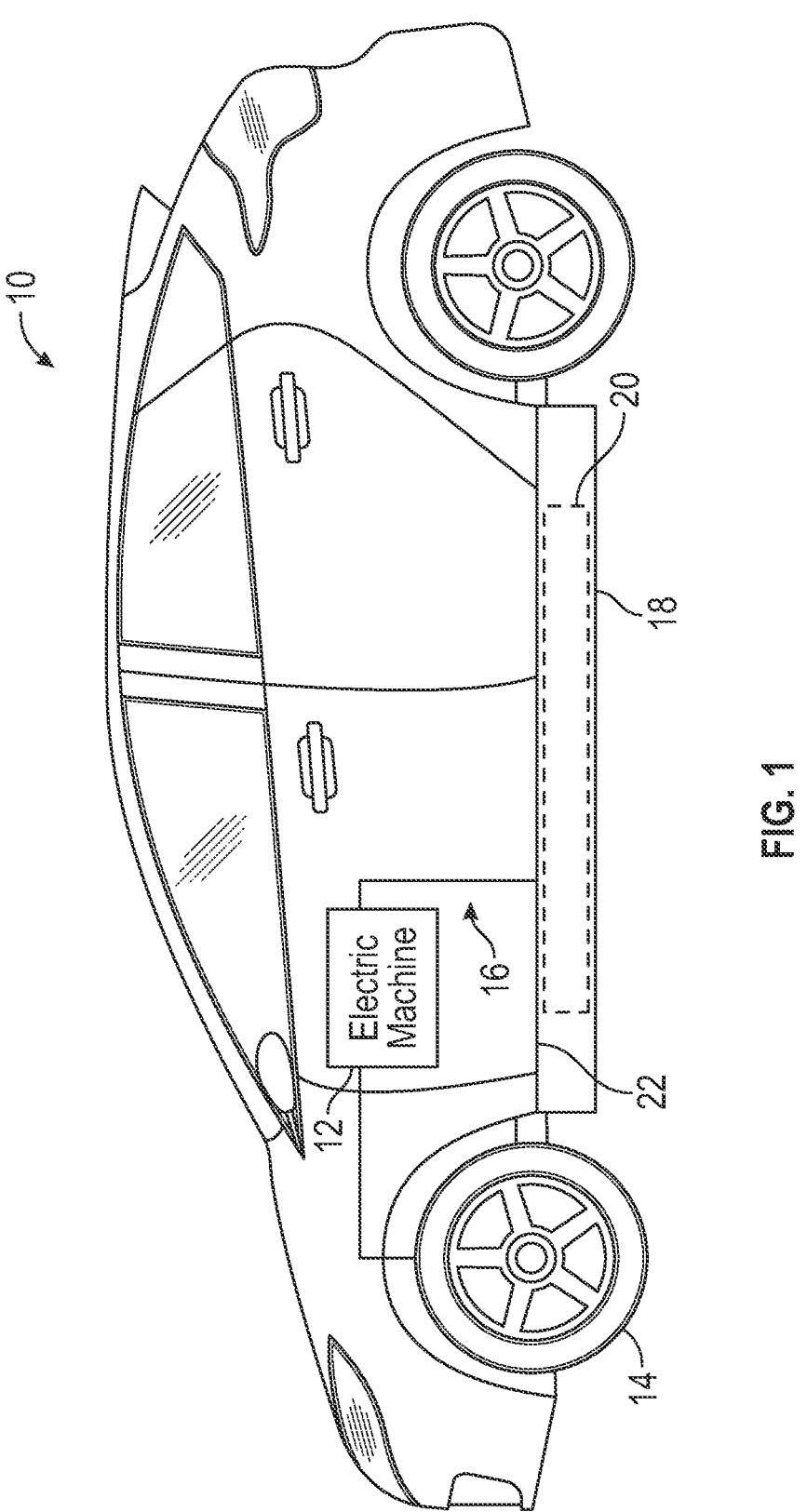
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In an embodiment, the electrified vehicle 10 is a car. However, the electrified vehicle 10 could alternatively be a pickup truck, a van, a sport utility vehicle (SUV), or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more drive wheels 14 of the electrified vehicle 10.

A voltage bus 16 may electrically couple the electric machine 12 to a traction battery pack 18. The traction battery pack 18 is capable of outputting electrical power for powering the electric machine 12 and/or other electrical loads of the electrified vehicle 10.

The traction battery pack 18 may be secured to an underbody 22 of the electrified vehicle 10. However, the traction battery pack 18 could be located elsewhere on the electrified vehicle 10 within the scope of this disclosure.

The traction battery pack 18 is an exemplary electrified vehicle battery. The traction battery pack 18 may be a high voltage traction battery pack that includes a cell-to-pack battery system 20. Unlike conventional traction battery pack battery systems, the cell-to-pack battery system 20 incorporates battery cells or other energy storage devices without the cells being arranged in individual arrays or modules inside the batter enclosure. The cell-to-pack battery system 20 therefore eliminates most if not all the array support structures (e.g., array frames, spacers, rails, walls, end plates, bindings, etc.) necessary for grouping the battery cells into the arrays/modules. Further, the cell-to-pack battery system 20 may provide the total high voltage bus electrical potential of the traction battery pack 18 with a single battery unit as opposed to conventional battery systems that require multiple individual battery arrays/modules that must be connected together after being positioned within the battery enclosure for achieving the total high voltage electrical potential.

Figure 2:
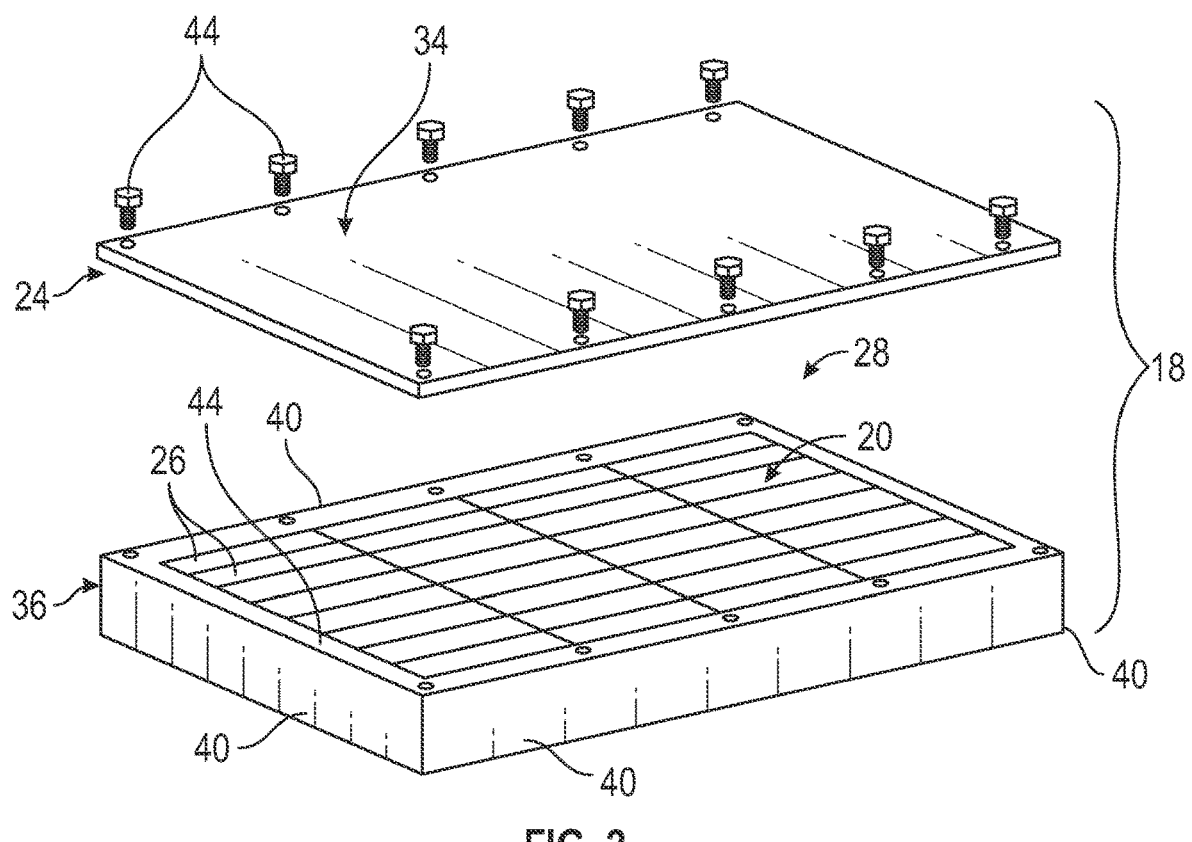
FIG. 2 illustrates a traction battery pack of the electrified vehicle of FIG. 1.
Figure 3:
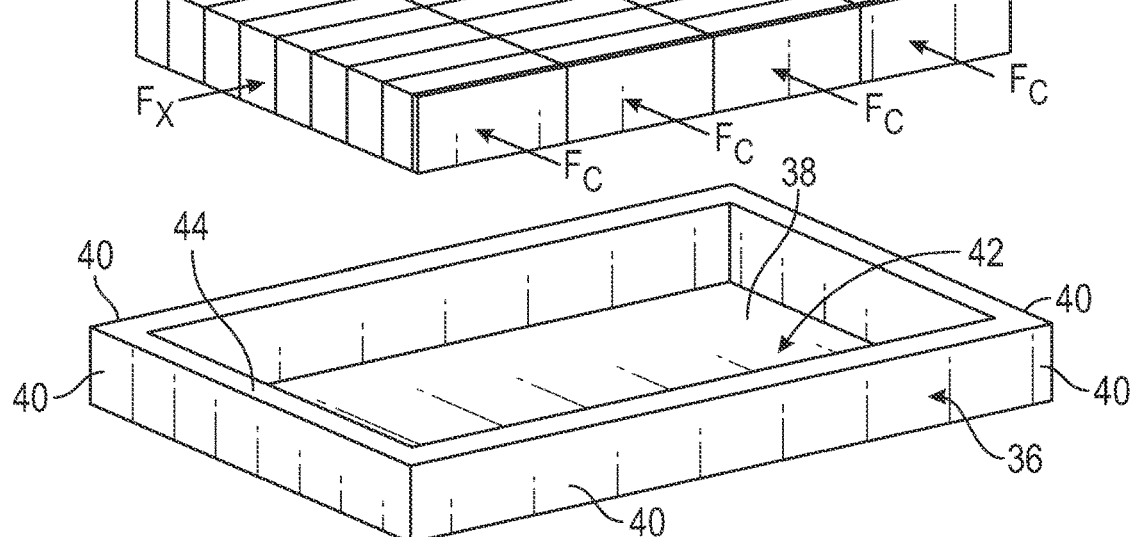
FIG. 3 illustrates a cell-to-pack battery system of the traction battery pack of FIG. 2.

Referring now to FIGS. 2 and 3, the traction battery pack 18 may include an enclosure assembly 24 that is arranged for housing the cell-to-pack battery system 20. In an embodiment, the cell-to-pack battery system 20 includes a plurality of battery cells 26 that are held within an interior area 28 established by the enclosure assembly 24.

The battery cells 26 may supply electrical power to various components of the electrified vehicle 10. The battery cells 26 may be stacked side-by-side relative to one another to construct a cell stack 30, and the cell stacks 30 may be positioned side-by-side in rows to provide a cell matrix 32.

In an embodiment, each cell stack 30 includes eight individual battery cells 26, and the cell matrix 32 includes four cell stacks 30 for a total of thirty-two battery cells 26. Providing an even quantity of battery cells 26 and an even quantity of cell stacks 30 can help to support an efficient electrical bussing arrangement. Although a specific number of battery cells 26 and cells stacks 30 are illustrated in the various figures of this disclosure, the cell-to-pack battery system 20 of the traction battery pack 18 could include any number of battery cells 26 and any number of cell stacks 30. In other words, this disclosure is not limited to the exemplary configuration shown in FIGS. 2 and 3.

In an embodiment, the battery cells 26 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure assembly 24 of the traction battery pack 18 may include an enclosure cover 34 and an enclosure tray 36. The enclosure cover 34 may be secured to the enclosure tray 36 to provide the interior area 28 for housing the cell-to-pack battery system 20.

The enclosure tray 36 may include a floor 38 and a plurality of side walls 40 arranged relative to one another to provide a cell-compressing opening 42. The floor 38 and the side walls 40 may be mechanically coupled to one another, such as by welding, for example.

During assembly of the traction battery pack 18, the enclosure cover 34 may be secured to the enclosure tray 36 at an interface 44 that substantially circumscribes the interior area 28. In some implementations, mechanical fasteners 46 may be used to secure the enclosure cover 34 to the enclosure tray 36, although other fastening methodologies (adhesion, etc.) could also be suitable.

The cell matrix 32 of the cell-to-pack battery system 20 may be positioned within the cell-compressing opening 42 provided by the enclosure tray 36. The exemplary enclosure tray 36 is depicted as including a single cell-compressing opening 42, however it should be understood that this disclosure extends to structural assemblies that provide one or more cell-compressing openings. The enclosure cover 34 may cover the cell matrix 32 within the cell-compressing opening 42 to substantially surround the battery cells 26 on all sides. Once fully assembled and positioned relative to the enclosure tray 36, the cell matrix 32 may establish a single battery unit capable of providing the total high voltage bus electrical potential of the traction battery pack 18.

The enclosure tray 36 may compress and hold the cell matrix 32 when the cell matrix 32 is received within the cell-compressing opening 42. In an embodiment, the side walls 40 of the enclosure tray 36 apply forces to the cell matrix 32 when the cell matrix 32 is positioned within the cell-compressing opening 42.

In an embodiment, in order to insert the cell matrix 32 into the cell-compressing opening 42, the cell matrix 32 may first be compressed, and then, while compressed, moved into place in the cell-compressing opening 42. A compressive force Fc may be applied to opposed ends of one of the cell stacks 30. The compressive force Fc essentially squeezes the battery cells 26 within the cell stack 30, thereby compressing the cell stack 30 and the individual battery cells 26 to a reduced thickness. While the compressive force Fc is applied to the cell stack 30, the cell stack 30 may be inserted into a respective cell-compressing opening 42 by a downward force FD. The downward force FD may be applied directly to one or more of the battery cells 26.

While the term "downward" is used herein to describe the downward force FD, it should be understood that the term "downward" is used herein to refer to all forces tending to press a cell stack 30 into a cell compressing opening 42. In particular, the term "downward" refers to all forces substantially perpendicular to the compressive force Fc, whether or not the force is truly in a "downward" direction. For example, this disclosure extends to cell stacks that are compressed and inserted into a cell-compressing opening in a sideways direction.

The cell stacks 30 could be individually compressed and inserted into the cell-compressing opening 42. In another embodiment, the entire cell matrix 32 is compressed and inserted into the cell-compressing opening 42. As schematically shown in FIG. 3, in such an embodiment, additional compressive forces Fx can compress the cell stacks 30 together for insertion of the cell matrix 32 into the cell-compressing opening 42. The compressive forces Fx are generally perpendicular to the compressive forces Fc. The compressive forces Fx may be applied together with the compressive forces Fc. The force FD may then be applied to move the entire cell matrix 32 into the cell-compressing opening 42.

In an embodiment, an entire perimeter of the cell-compressing opening 42 is defined by the side walls 40 of the enclosure tray 36. The side walls 40 can apply a compressive force to the battery cells 26 about the entire perimeter of the cell matrix 32. The side walls 40 may therefore function as a rigid halo-type structure that compresses and tightly holds the cell matrix 32.

The configuration described above is considered to be a cell-to-pack type battery pack, which differs from conventional battery pack types that include enclosures holding arrays of battery cells enclosed by array support structures that are spaced apart from walls of a battery enclosure, and where the battery enclosure does not apply compressive forces to any of the battery cells. The cell-to-pack type battery pack described herein also eliminates the rigid cross members that are commonly secured to the enclosure tray of conventional traction battery backs for providing mounting points for securing the battery arrays and the enclosure cover.

Figure 4:
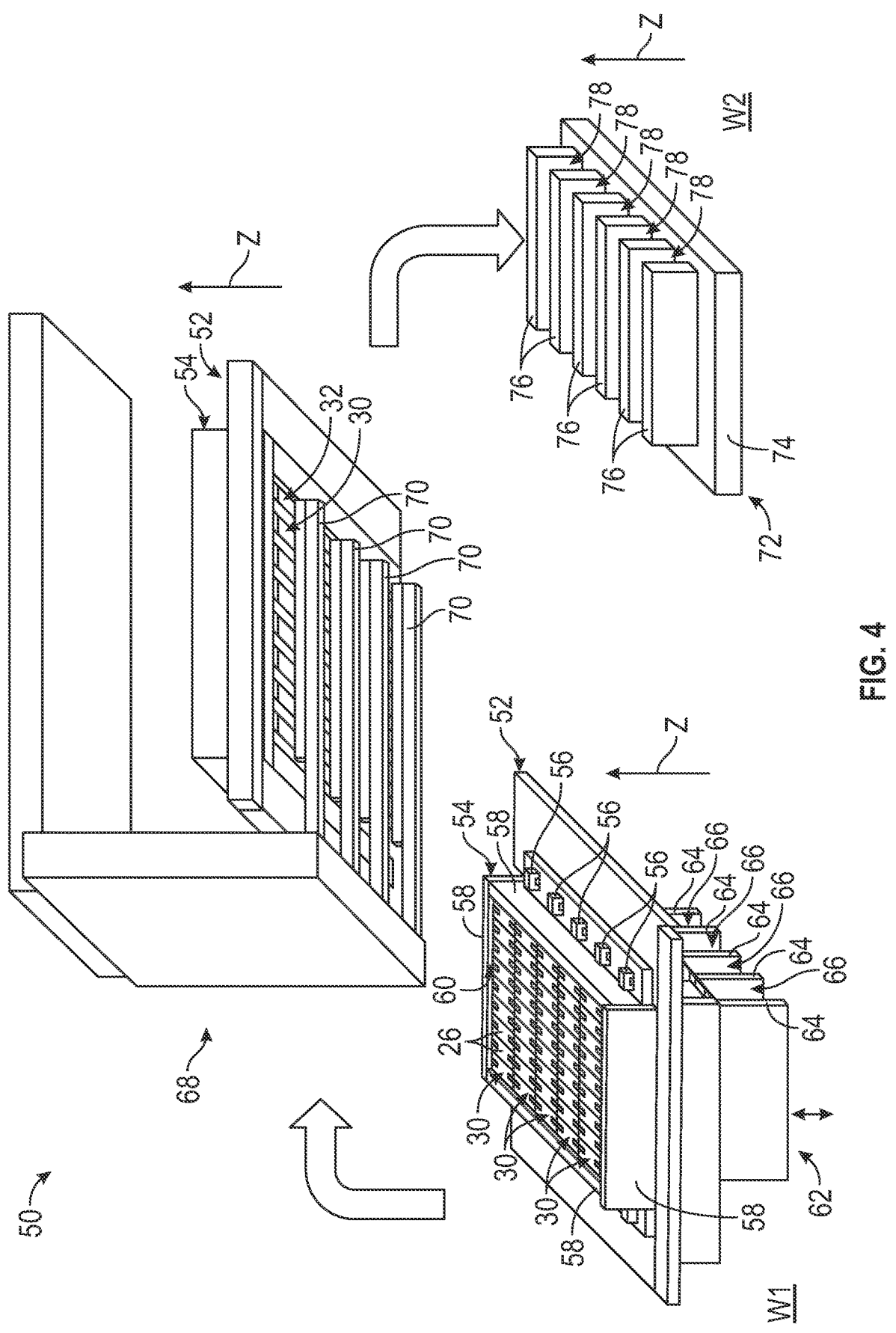
FIGS. 4 and 5 schematically illustrate a method of assembling a traction battery pack that includes a cell-to-pack battery system.
Figure 5:
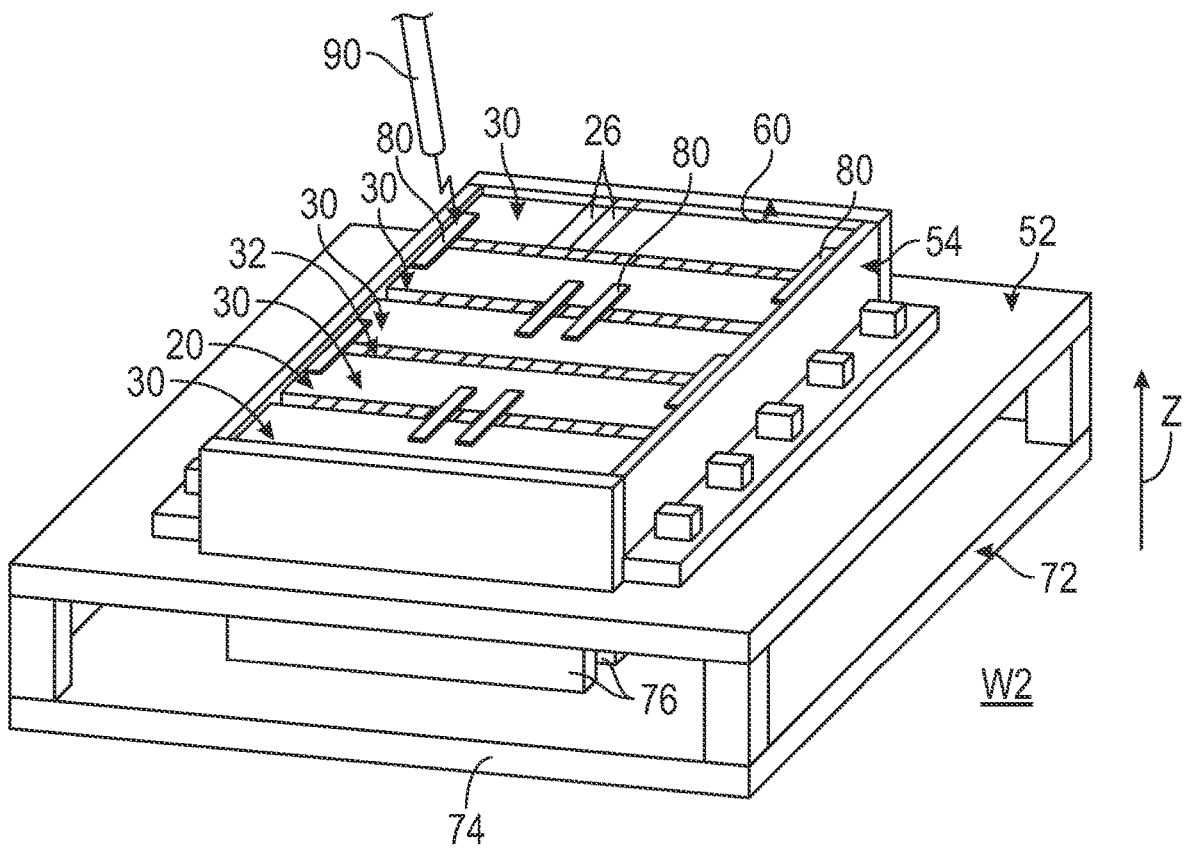

FIGS. 4-5, with continued reference to FIGS. 1-3, schematically illustrate a method 50 for assembling portions of the traction battery pack 18, and in particular, for supporting, lifting, and transferring a grouping of the battery cells 26 between respective workstations of a manufacturing assembly line. The method 50 may include a greater or fewer number of steps than recited below, and the exact order of the steps is not intended to limit this disclosure.

Referring first to FIG. 4, the cell matrix 32, which in this embodiment includes five cells stacks 30, may be positioned relative to a halo pallet 52 at a cell matrix assembly workstation W1. The halo pallet 52 may include a halo structure 54 that is configured to receive the cell matrix 32. Locator pins 56 may be utilized to locate the halo structure 54 at a proper position relative to the halo pallet 52.

The halo structure 54 may include a plurality of side walls 58 arranged relative to one another to provide a cell-receiving opening 60. The cell matrix 32 may be moved relative to the halo pallet 52 until the cell matrix 32 is vertically beneath the halo structure 54 and the cell-receiving opening 60.

The method 50 may further include inserting the cell matrix 32 into the cell-receiving opening 60 of the halo structure 54 via a cell-to-matrix pusher assembly 62. To insert the cell matrix 32, a plurality of plungers 64 of the cell-to-matrix pusher assembly 62 may be driven upwards by actuators (not shown) to press the cell stacks 30/cell matrix 32 vertically upward along a Z-axis into the cell-receiving opening 60. Although the Z-axis is shown as a being a vertical axis in this embodiment, the cell stacks 30/cell matrix 32 could be inserted into the cell receiving opening 60 in other directions.

In certain implementations, the plungers 64 of the cell-to-matrix pusher assembly 62 could be driven by a pneumatic actuator. However, other types of actuators could alternatively be employed for inserting the cell matrix 32 into the cell-receiving opening 60.

Each plunger 64 of the cell-to-matrix pusher assembly 62 may contact one of the cell stacks 32 when pushing the cell matrix 32 upwardly into the cell-receiving opening 60. However, other configurations could also be possible within the scope of this disclosure.

In an embodiment, the plungers 64 are spaced apart from one another to define a gap 66 between each adjacent pair of the plungers 64. The gaps 66 may be sized to receive additional tooling that can be employed during the method 50, as is further discussed below.

After the inserting, the halo structure 54 surrounds an outer perimeter of the cell matrix 32. The halo structure 54 may exert a compressive force on the cell matrix 32. The halo structure 54 may permit some expansion of the battery cells 26 when the cell matrix 32 is received within the cell-receiving opening 60.

Once the cell matrix 32 is inserted into the cell-receiving opening 60 of the halo structure 54, the halo pallet 52 may be lifted and transferred to an additional workstation, such as a welding workstation W2, for example. The lifting and transferring may be achieved via a cell matrix support structure 68. The cell matrix support structure 68 may include a plurality of locator pads 70 that are configured to support the cell matrix 32 in the Z-axis direction relative to the halo pallet 52/halo structure 54 when the plungers 64 of the cell-to-matrix pusher assembly 62 are released and backed away from the halo structure 54. When positioned beneath the halo structure 54, each locator pad 70 may support one cell stack 30 and may extend along an axis that is substantially parallel to the longitudinal axis of the cell stack 30 it is supporting.

Prior to releasing the plungers 64 at the cell matrix assembly workstation W1, the locator pads 70 of the cell matrix support structure 68 may be positioned within the gaps 66 between the plungers 64 such that the locator pads 70 are positioned for supporting the cell matrix 32 within the cell-receiving opening 60 of the halo structure 54. The plungers 64 may then be released, thereby resulting in the cell matrix support structure 68 being responsible for supporting the halo pallet 52, which now includes the halo structure 52 and the cell matrix 32, as it is lifted and transferred away from the cell matrix assembly workstation W1.

Next, the cell matrix support structure 68 may be used to transfer the halo pallet 52 to the welding workstation W2. The halo pallet 52, including the halo structure 54 and the cell matrix 32, may be positioned relative to a weld pallet 72 at the welding workstation W2. The weld pallet 72 may include a base 74 and a plurality of pusher blocks 76 that protrude upwardly from the base 74. The pusher blocks 76 are configured to support the halo pallet 52 above the base 74 and are further configured to support the cell matrix 32 in the Z-axis direction relative to the halo structure 54 while at the welding workstation W2.

In an embodiment, the pusher blocks 76 are spaced apart from one another along a length of the base 74 to define a gap 78 between each adjacent pair of the pusher blocks 76. The gaps 66 may be sized to receive the locator pads 70 of the cell matrix support structure 68 as the halo pallet 52 is lowered in place over top of the weld pallet 72. Once the halo pallet 52 is positioned atop the weld pallet 72, the locator pads 70 may be removed from the gaps 78, and the cell matrix support structure 68 may then be moved away from the halo pallet 52/weld pallet 72.

Referring now to FIG. 5, busbar modules 80 can then be installed and secured to terminals of the battery cells 26 associated with the cell matrix 32 while at the welding workstation W2. Each busbar module 80 may include one or more busbars that can be electrically connected to one or more of the cells stacks 30 via laser welding operations. Although laser welding is specifically disclosed herein, it should be understood that other welding processes could be utilized to electrically connect the busbar modules 80 to the battery cell 26 terminals. During an exemplary laser welding operation, a laser welding device 90 may be positioned relative to the busbar modules 80 and then controlled to weld the busbar modules 80 to the terminals. Completion of the welding operations may result in establishing at least a portion of the cell-to-pack battery system 20.

The pressing, lifting, transferring, and welding steps of the method 50 described above could be part of an automated process that is performed by robotic automation tooling. In other implementations, all or portions of the method 50 could be at least partially manually performed at one or more workstations of the assembly line, such as by or with the aid of one or more assembly line worker(s).

The exemplary manufacturing processes described herein provide a methodology for lifting and transferring a non-rigid grouping of battery cells between assembly line workstations. The proposed lifting and transferring techniques maintain a battery cell positioning necessary for welding and provide solutions to various assembly complexities that can arise as a result of eliminating much of the array support structures associated with conventional traction battery packs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of assembling a traction battery pack using an assembly line, the method comprising:
   inserting a cell matrix into a cell-receiving opening of a halo structure of a halo pallet at a first workstation of the assembly line;
   lifting the halo pallet with a cell matrix support structure that is at least partially positioned beneath the halo pallet;
   transferring the halo pallet from the first workstation to a second workstation of the assembly line with the cell matrix support structure; and
   positioning the halo pallet on top of a weld pallet located at the second workstation.

2. The method as recited in claim 1, wherein the cell matrix is a subcomponent of a cell-to-pack battery system of the traction battery pack.

3. The method as recited in claim 1, wherein the first workstation is a cell matrix assembly workstation and the second workstation is a welding workstation.

4. The method as recited in claim 1, wherein inserting the cell matrix includes pushing the cell matrix upwardly into the cell-receiving opening of the halo structure with a plunger of a cell-to-matrix pusher assembly.

5. The method as recited in claim 4, comprising backing the plunger away from the halo pallet prior to lifting the halo pallet.

6. The method as recited in claim 1, comprising positioning a locator pad of the cell matrix support structure within a gap located between an adjacent pair of plungers of a cell-to-matrix plunger assembly prior to lifting the halo pallet.

7. The method as recited in claim 6, comprising backing the plungers away from the halo pallet after positioning the locator pad within the gap.

8. The method as recited in claim 1, wherein positioning the halo pallet on top of the weld pallet includes positioning a locator pad of the cell matrix support structure within a gap located between an adjacent pair of pusher blocks of the weld pallet.

9. The method as recited in claim 1, comprising, during the lifting and the transferring, supporting the cell matrix from a location beneath the cell matrix with the cell matrix support structure.

10. The method as recited in claim 9, wherein supporting the cell matrix includes supporting a first cell stack of the cell matrix with a first locator pad of the cell matrix support structure.

11. The method as recited in claim 10, wherein supporting the cell matrix includes supporting a second cell stack of the cell matrix with a second locator pad of the cell matrix support structure.

12. A method of assembling a traction battery pack using an assembly line, the method comprising:

inserting a cell matrix into a cell-receiving opening of a halo structure of a halo pallet at a first workstation of the assembly line;

lifting the halo pallet with a cell matrix support structure that is at least partially positioned beneath the halo pallet;

transferring the halo pallet from the first workstation to a second workstation of the assembly line with the cell matrix support structure;

positioning the halo pallet on top of a weld pallet located at the second workstation; and welding a busbar module to the cell matrix at the second workstation.

13. The method as recited in claim 12, wherein the welding includes laser welding.

14. A method of assembling a traction battery pack using an assembly line, the method comprising:

inserting a cell matrix into a cell-receiving opening of a halo structure of a halo pallet at a first workstation of the assembly line;

lifting the halo pallet with a cell matrix support structure that is at least partially positioned beneath the halo pallet;

transferring the halo pallet from the first workstation to a second workstation of the assembly line with the cell matrix support structure;

during the lifting and the transferring, supporting the cell matrix from underneath with the cell matrix support structure; and performing a welding operation on the cell matrix at the second workstation.

15. The method as recited in claim 14, wherein the welding operation is a laser welding operation.

16. The method as recited in claim 14, wherein performing the welding operation includes welding a busbar module to the cell matrix.

17. The method as recited in claim 14, wherein inserting the cell matrix includes pushing the cell matrix upwardly into the cell-receiving opening of the halo structure with a cell-to-matrix pusher assembly.

18. The method as recited in claim 17, comprising positioning a locator pad of the cell matrix support structure within a gap located between an adjacent pair of plungers of a cell-to-matrix plunger assembly prior to lifting the halo pallet.

19. The method as recited in claim 14, wherein transferring the halo pallet includes positioning a locator pad of the cell matrix support structure within a gap located between an adjacent pair of pusher blocks of a weld pallet of the second workstation.

20. The method as recited in claim 14, comprising, prior to inserting the cell matrix, using a locator pin to locate the halo structure relative to the halo pallet.

\* \* \* \* \*